United States Patent [19]

Hartmann

[11] 4,298,251
[45] Nov. 3, 1981

[54] DUAL MACRO ZOOM OPTICAL SYSTEM
[75] Inventor: Rudolf Hartmann, Winter Park, Fla.
[73] Assignee: Bell & Howell Company, Chicago, Ill.
[21] Appl. No.: 75,653
[22] Filed: Sep. 14, 1979

Related U.S. Application Data

[63] Continuation-in-part of Ser. No. 744,835, Nov. 24, 1976, abandoned.

[51] Int. Cl.³ .............................................. G02B 15/18
[52] U.S. Cl. ..................................... 350/428; 350/430
[58] Field of Search ................ 350/184, 186, 187, 428, 350/430

[56] References Cited

U.S. PATENT DOCUMENTS

| | | | |
|---|---|---|---|
| 3,773,402 | 11/1973 | Gela et al. | 350/184 |
| 3,784,285 | 1/1974 | Watanabe | 350/187 |
| 3,884,555 | 5/1975 | Suwa et al. | 350/187 |
| 4,062,621 | 12/1977 | Fleischman | 350/184 |
| 4,113,355 | 9/1978 | Tsusi | 350/184 |

FOREIGN PATENT DOCUMENTS 2234728  1/1974  Fed. Rep. of Germany .
1475696  6/1977  United Kingdom .

*Primary Examiner*—Conrad J. Clark
*Attorney, Agent, or Firm*—Harold V. Stotland; Roger M. Fitz-Gerald

[57] ABSTRACT

The system has a variator lens and a compensator lens which are mutually displaceable for varying the focal length of the optical system. In the normal zoom range, the focal length is adjustable between a telephoto condition and a wide angle condition, in accordance with the positions of the variator and compensator lenses. The system has macro capability in both a range beyond the extreme telephoto end of the zoom range and also in a range beyond the extreme wide angle end of the zoom range. In at least the macro range at the telephoto end, the slots in the camming sleeve for the variator and compensator lenses lie substantially in planes.

8 Claims, 7 Drawing Figures

DUAL MACRO ZOOM OPTICAL SYSTEM

CROSS REFERENCE TO RELATED APPLICATION

This application is a continuation-in-part of application Ser. No. 744,835, filed Nov. 24, 1976, now abandoned.

BACKGROUND OF THE INVENTION

Currently, a standard zoom optical system for a movie camera has the capability of focusing on objects located at any distance between about five feet and infinity. The focusing function in this range is normally performed by a set of lenses referred to as the focusing group, located at the front end of the optical system.

The desired framing of the scene may be adjusted by adjusting the "zoom" of the lens. This is accomplished by moving a variator lens group and a compensator lens group, which are mutually displaceable in a predetermined relationship. A common zoom range in a zoom optical system for a movie camera is 7-45 millimeters.

It is desirable that the zoom lens be capable of focusing on objects located closer than five feet. There are and have been zoom lenses on the market and patented which can focus on objects in the extreme closeup or "macro" range. These currently available lenses have means selectively to be placed in the normal zoom mode or in a macro mode. In the former mode, the zoom lens can be focused on objects say beyond five feet, while in the macro mode the lens may be focused on objects closer than five feet.

However, all such currently available lenses as far as known by the applicant herein, do not offer what may be characterized as a variable focal length or a variable magnification within the macro range. In other words, an object located at for example three feet may be focused by these lenses, but the reduction ratio is fixed; i.e., the size of the scene for an object located in the macro range is fixed. The reason for this is because currently available zoom lenses have macro capability only at one end of the normal zoom range. Some such lenses have macro capability in the range beyond the wide angle end of the zoom range and others have macro capability in the range beyond the telephoto end of the zoom range.

So as to increase the versatility of a zoom lens and provide for a more selectable framing or reduction in extreme closeup photography, two macro modes have been mentioned in at least one prior U.S. patent, although no such zoom lens having dual macro capability is known to be or have been on the market.

Reference may be had to U.S. Pat. No. 3,884,555, to Suwa et al. which discloses some possible forms in which macro capability exists at both ends of the zoom range. For example, in FIG. 1, such a system is disclosed. The common method of construction is to use camming slots in the sleeves that carry the variator and compensator lens groups. A linear camming slot, that is one whose axis is substantially planar, is much easier to manufacture within the exceedingly close tolerance which is required of lens systems. Thus, the nonlinear movement of the compensator and variator lenses, particularly in the macro ranges as shown in FIGS. 1 and 2 of the Suwa et al. patent, makes it uneconomical to manufacture.

There is currently in the marketplace a zoom lens of the type described herein with a normal range and a macro capability at the wide angle end of the zoom range. This particular system is sold by Bell & Howell Company, the assignee of the present application, but it has no macro capability beyond the telephoto end of the normal zoom range.

SUMMARY OF THE INVENTION

It is therefore a most important object of the present invention to provide a zoom lens which has macro capability in two ranges, respectively beyond the wide angle end of the normal zoom range and beyond the telephoto end of the normal zoom range, which can be relatively economically manufactured.

Another object is to linearize the slots in the sleeves for the variator and compensator lenses in a zoom lens, particularly in the macro ranges.

In summary, there is provided a variable focal length optical system which is focusable within a normal range defined at one end by a normal telephoto condition and at the other end by a normal wide angle condition, and being focusable within a first macro range defined at one end by a macro wide angle condition and at the other end by the normal wide angle condition, and being focusable within a second macro range defined at one end by a macro telephoto condition and at the other end by the normal telephoto condition, the optical system comprising focusing lens means for focusing said optical system on an object located within the normal range, a zoom lens assembly including variator lens means, compensator lens means and a camming sleeve having a variator camming slot and a compensator camming slot, the variator lens means and the compensator lens means being located in the camming sleeve and being mutually displaceable therein in a predetermined relationship for varying the focal length of the optical system, and collimator lens means for collimating rays from the compensator lens means and occupying a fixed position in the optical system irrespective of the focal length thereof, the variator lens means and the compensator lens means occupying predetermined positions corresponding to the various conditions of the optical systems, the variator lens means including a variator holder, a variator lens group mounted therein, and a variator pin protruding therefrom and into the variator slot, the variator slot having first and second end portions and a middle portion therebetween respectively corresponding to the first macro range, the second macro range, and the normal range, the axis of the second end portion lying substantially in a plane, the compensator lens means including a compensator holder, a compensator lens group mounted therein, and a compensator pin protruding therefrom and into the compensator slot, the compensator slot having first and second end portions and a middle portion therebetween respectively corresponding to the first macro range, the second macro range and the normal range, the axis of the second end portion lying substantially in a plane.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the invention.

BRIEF DESCRIPTION OF THE DRAWINGS

For the purpose of facilitating an understanding of the invention, there is illustrated in the accompanying drawings, a preferred embodiment thereof, from an inspection of which, when considered in connection with the following description, the invention, its construction, and operation, and many of its advantages should be readily understood and appreciated.

DESCRIPTION OF THE PREFERRED EMBODIMENT

Figure 1:
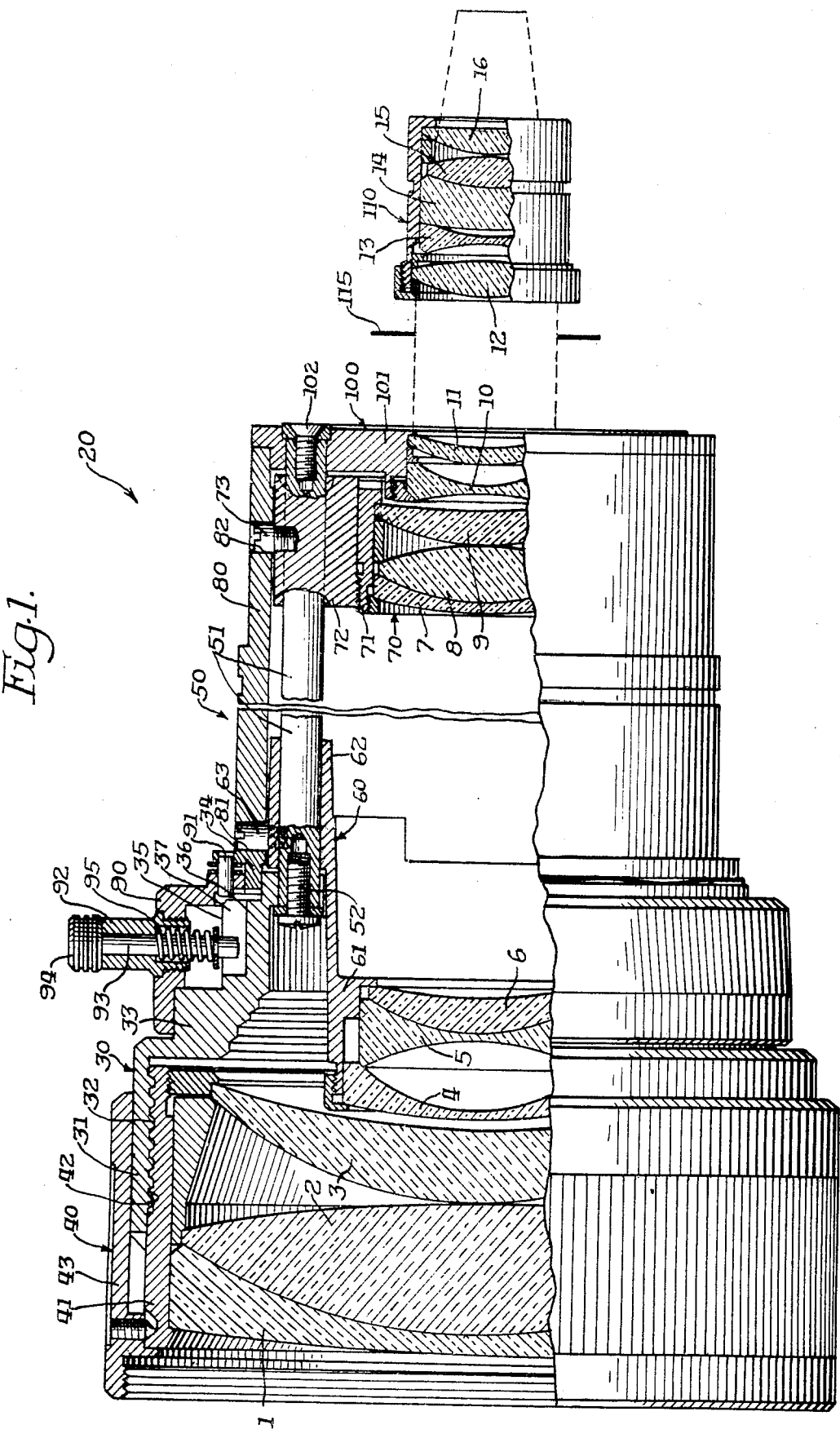
FIG. 1 is an elevational view of an optical system incorporating the features of the present invention, the upper portion being shown in fragmentary sectional view taken in a plane containing the optical axis.

Turning now to the drawings, and more particularly to FIG. 1 thereof, there is depicted a variable focal length optical system 20. The optical system 20 includes a main body 30 having a front portion 31 formed with a helicoid surface 32. A midportion of the main body 30 defines a shoulder 33 of a diameter less than the diameter of the front portion 31. The main body 30 further has a rear portion 34 of further reduced diameter. About 250° of such rear portion 34 defines an annular bearing surface 35. The balance of the rear portion 34 extends about 110°, and is inset so as to provide an annular surface 36. A radial stop surface 37 is provided at one of the junctions of the surfaces 35 and 36 and another such radial stop surface is provided at the other junction, although the latter radial stop surface is not shown in the drawings.

The optical system 20 further comprises a focusing assembly 40, which includes a lens barrel or holder 41 within which is fixedly mounted the focusing lens group, that is, the lenses 1, 2 and 3. A portion of the outer surface of the holder 41 is provided with a helicoid portion 42 that mates with the helicoid surface 32. Focusing is effectuated by rotating the lens holder 41 to move the focusing lens group selectively forwardly and rearwardly along the axis of the optical system 20. The focusing assembly 40 also has a decorative outer ring 43 which is in juxtaposition with the outer surface of the front portion 31 of the main body 30.

The optical system 20 further comprises a zoom lens assembly 50, in turn composed of a variator 60, a compensator 70, a camming sleeve 80 and a zoom ring 90. Three rods 51 (only one is shown) are arranged equiangularly about the optical axis of the system 20, and are fixedly attached to the rear portion 34 of the main body 30 by means of screws 52. These rods 51 provide a guide or track for the variator 60 and the compensator 70, as will be described.

The variator 60 includes a barrel or holder 61, within which is mounted the variator lens group which consists of the lenses 4, 5 and 6. A set of three bearings 62 (only one is shown) extends rearwardly from the holder 61. The three rods 51 respectively pass slideably through these three bearings 62, whereby the variator 60 is selectively movable forwardly and rearwardly along the optical axis of the optical system 20. Carried on the one of the bearings 62 shown in FIG. 1, is a pin 63 protruding radially outwardly.

The compensator 70 includes a barrel or holder 71, within which is mounted the compensator lens group consisting of the lenses 7, 8 and 9. The holder 71 carries a set of three bearings 72 which respectively have slideably passed therethrough the rod 51. Thus, the compensator 70 is also selectively movable forwardly and rearwardly along the optical axis of the optical system 20. The one bearing 72 depicted in FIG 1 carries a pin 73 protruding radially outwardly therefrom.

Figure 2:
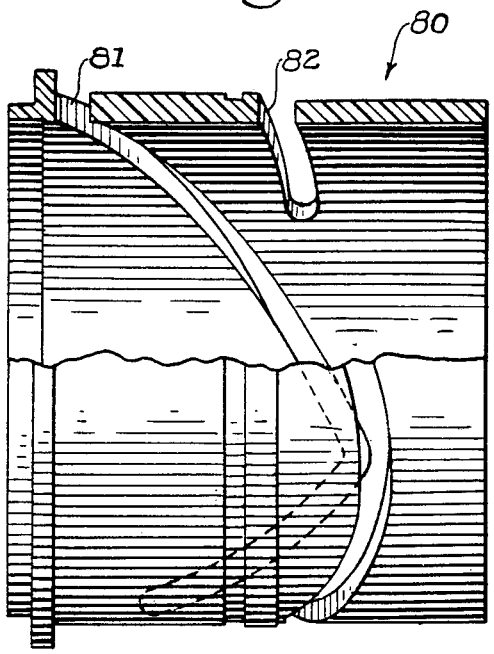
FIG. 2 is a perspective view of the camming sleeve of the optical system shown in FIG. 1.
Figure 3:
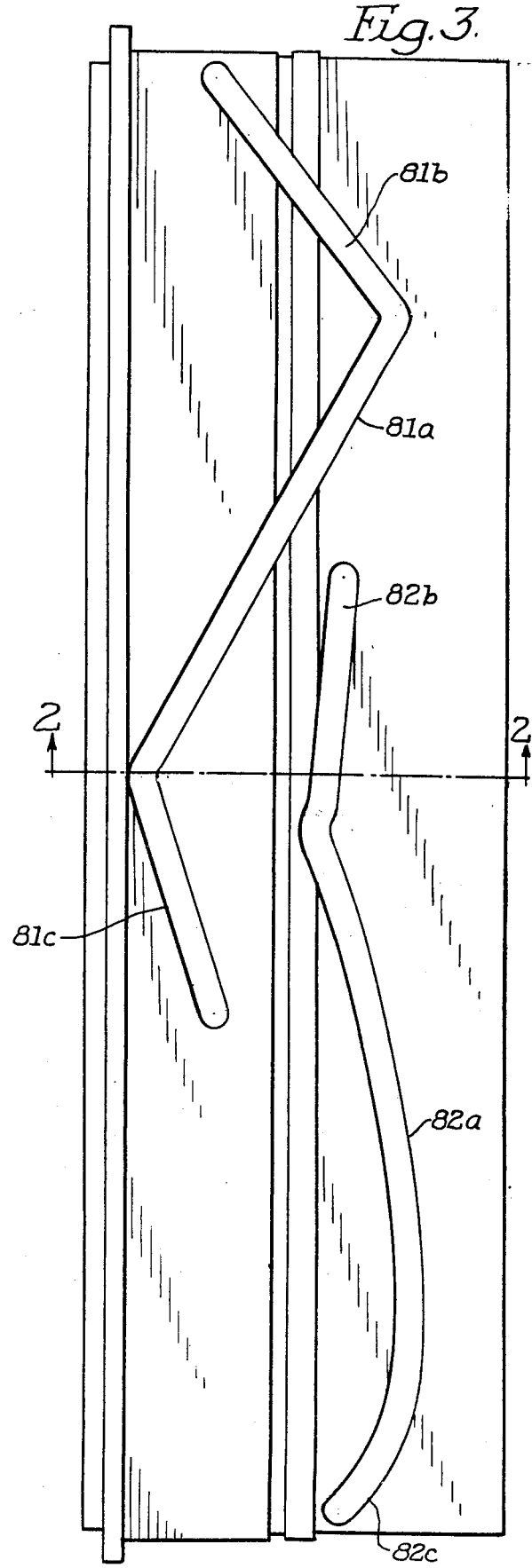
FIG. 3 is a schematic view of the surface of the sleeve of FIG. 2.

The camming sleeve 80 includes a camming variator slot 81 and a camming compensator slot 82, the details of which are more clearly shown in FIGS. 2 and 3. These details will be explained shortly. The pin 63 of the variator extends into the variator camming slot 81, and similarly the pin 73 on the compensator extends into the compensator camming slot 82. Rotation of the camming sleeve 80 in one direction will draw together the variator 60 and the compensator 70 respectively in accordance with the paths traced by the variator slot 81 and the compensator slot 82. The variator 60 and the compensator 70 are shown in FIG. 1 to be at the wide angle end of the normal zoom range. Rotation of the camming sleeve 80 in the appropriate direction will draw together the variator 60 and the compensator 70 until the other extreme is reached whereupon the zoom lens assembly 50 will be in the other end or telephoto condition of the normal zoom range.

The zoom ring 90 is fixedly attached to the camming sleeve 80 by means of pins 91. The front portion of the zooming ring 90 is in juxtaposition with the outer surface of the shoulder 33 of the main body 30. Protruding from the zoom ring 90 is a lug 92 having a bore extending therethrough. A pin 93 is slideably carried in such bore, and carries at one end a knob 94. Within the lug 92 is a spring 95 that biases the pin 93 radially inwardly. In FIG. 1, the lower end of the pin 93 is located above the inset annular surface 36, and is in contact with the stop surface 37. The zoom ring 90 and the camming sleeve 80 being ganged together, rotation of the zoom ring 90 effectuates the relative movement of the variator 60 and the compensator 70 described above. In the position shown in FIG. 1 with the pin 93 against the stop surface 37, the zoom lens assembly 50 is in the wide angle end of the normal zoom range. If the zoom ring 90 is rotated to the other extreme, that is to say, when the pin 93 contacts the other stop surface which is not shown, the variator 60 and the compensator 70 will be as close together as they can get and therefore the zoom lens assembly 50 will be in the telephoto end of the normal zoom range.

The variator 60 varies the equivalent focal length of the objective, and the compensator functions to correct aberrations caused by varying the focal length of the optical system.

The outer surface of the zoom ring 90 will usually be provided with indicia indicating the focal length of the optical system in accordance with its position of rotation. Such indicia would be normally determined on the basis of a pointer marking on the main body 30. Similarly, indicia will usually be provided on the outer ring 43 of the focusing assembly 40 to apprise the user of the distance to the object.

The optical system 20 has two macro ranges as will be described. To arrive at the position shown in FIG. 1 where the pin 93 is in contact with the stop surface 37, the zoom ring 90 was appropriately rotated. To place the zoom lens assembly 50 in one of the macro modes, the knob 94 is pulled so that the inner end of the pin 93 clears the other annular surface 35, whereupon the zoom ring 90 can be rotated further. The knob 94 can be released whereupon the biasing furnished by the spring 95 causes the pin 93 to bear against the annular surface 35. The optical system 20 is now in the macro range which is beyond the wide angle end of the normal zoom range of the optical system 20. The configuration of the slots 81 and 82 causes the variator 60 and the compensator 70 to move with respect to one another. The zoom ring 90 can be rotated until the ends of the camming slots 81 and 82 are reached, whereupon the optical system 20 is in what may be termed a second macro wide angle condition. If the ring 90 is then rotated back, the optical system 20 will ultimately reach the other end of this first macro range, termed the first macro wide angle condition. A slight bit of additional movement will cause the pin 93 to snap into the inset portion of the main body 30 defined by the annular surface 36.

Now the zoom ring 90 may be rotated until the pin 91 reaches the other stop surface, which constitutes the normal telephoto condition of the optical system 20. If the knob 94 is then withdrawn, the zoom ring 90 may be rotated further so that the pin 93 again rides on the surface 35. Now the optical system 20 is in its second macro range defined at this initial point by a first macro telephoto condition. The zoom ring 90 may be then rotated further to change the positions of the variator 60 and the compensator 70 in accordance with the corresponding configuration of the camming slots 81 and 82, until the ends of these slots are reached, whereupon the optical system 20 is at the other end of the second macro range defined by what is referred to herein as a second macro telephoto condition.

In addition to the indicia of focal length on the zoom ring 90, it would also have indicia signifying that the optical system was either in the macro mode and also which of the two macro modes it was in.

In the normal zoom range, the optical system 20 is focused onto an object by means of rotation of the focusing assembly 40 as previously described. The zoom ring 90, with the pin 91 between the stop surfaces, is then rotated to provide the desired composure or framing of the image. The optical system 20 is not focusable when the object is anywhere between about five feet and infinity. When the object is nearer the optical system 20 than five feet, the optical system 20 is placed in one of its macro modes, whereupon an object between about five feet and six to seven inches can be properly focused. In the macro mode, the focusing assembly 40 has little if any function. Usually, it is placed at its "infinity" setting although it does not make any significant difference if any other setting is used. The zoom ring 90 is rotated to focus the object. Further details of the zoom lens assembly 50 both as to construction and performance will be described hereinafter.

The optical system 20 further comprises a collimator 100 which includes a barrel or holder 101 containing the collimator lens group which consists of the lenses 10 and 11. The holder 101 is attached to the rod 51 by means of screws 102. It is important to note that the position of the collimator 100 is fixed, that is, it is not moved to change the focal length of the optical system 20. The collimator 100 serves to collimate rays exiting the compensator 70.

The optical system 20 further comprises an image forming unit 110 including the lenses 12 through 16.

The image forming unit 110 is a prime lens group forming a focal system with the earlier described components. A diaphragm stop 115 is arranged between the collimator 100 and the image forming unit 110.

Turning now to FIGS. 2 and 3, further details of the camming sleeve 80 and the slots 81 and 82 will be described. The variator slot 81 actually consists of three portions, a middle portion 81a and first and second end portions 81b and 81c. As shown in FIG. 3, each of the three portions, 81a, 81b and 81c, is linear. However, on the annular surface of the sleeve 80, they are not truly linear but rather each may be described as having its associated longitudinal axis lying in a plane. The slot 82 also has three portions, a middle portion 82a and first and second end portions 82b and 82c. The portion 82b is shown to be linear in FIG. 3. The portions 82a and 82c are not linear, but the midportion 82a smoothly and continuously merges into the first end portion 82c. The fact that the portions of the two slots 81a, 81b, 81c and 82b are "linear" simplifies and renders more economical the manufacture of the sleeve 80. Also, the continuity between the portions 82a and 82c renders the cost less than if these two portions had a discrete discontinuity between them.

In a preferred embodiment, the slot portions 81a and 82a had an angular extent of about 110°, while each of the portions 81b, 81c, 82b and 82c had an angular extent of about 58° to 59°.

While there has been on the market an optical system having a camming sleeve with variator and compensator slots, each slot has only two portions corresponding to the "a" and "c" portions. The addition of the portion 81b to the variator slot and the addition of the portion 82b to the compensator slot enables the optical system 20 to function in two different macro modes, the advantage of which will be described shortly. The fact that these two portions 81b and 82b are "Linear" enables the modification of an optical system to incorporate two macro modes inexpensively.

Figure 4:
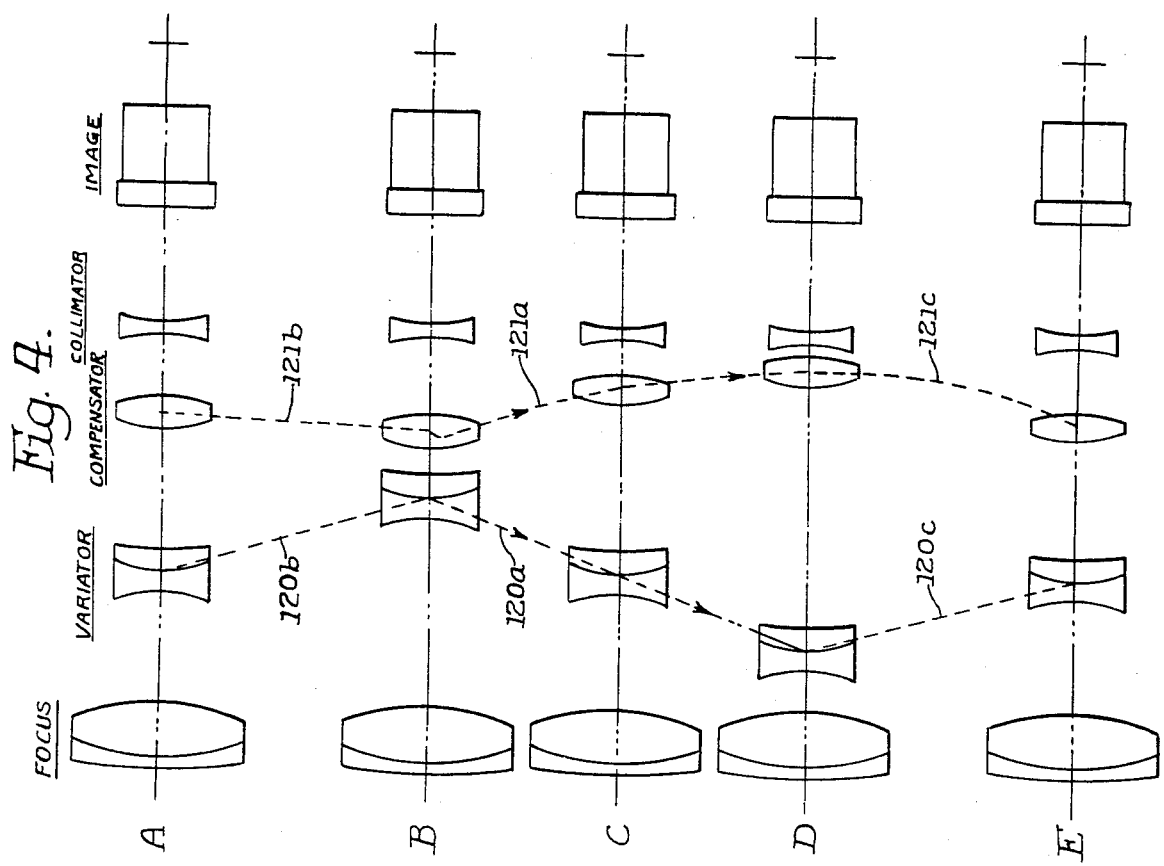
FIG. 4 is a diagrammatic representation of the various conditions of the optical system in its normal zoom range and its two macro ranges.

FIG. 4 diagrammatically illustrates the positions of the five main optical elements of the optical system 20 corresponding to its various conditions. In each of the five examples illustrated, the focusing assembly 40 is shown to be in the same position, since it has no effect on focal length in the normal range (FIGS. 4B, C and D) and has virtually no effect in the macro ranges (FIGS. 4A and 4E). The collimator 100 and the image forming unit 110 are stationary and do not move with respect to the optical system 20. FIG. 4B shows the positions of the variator 60 and the compensator 70 when the optical system 20 is in the normal telephoto condition. FIG. 4D depicts their positions in the normal wide angle condition, while FIG. 4C depicts their positions at the middle of the normal range. FIG. 4A illustrates the extreme or second macro telephoto condition.

Actually the first macro telephoto condition is very nearly that shown in FIG. 4B. Similarly, the extreme or second macro wide angle condition is shown in FIG. 4E, while the first such macro wide angle condition would be very nearly that depicted in FIG. 4D. The path of the variator is labeled 120a, 120b and 120c and it can be seen that each of these paths is linear corresponding to the linearity of the slot portions 81a, 81b and 81c respectively. The compensator path is marked 121a, 121b and 121c. The path 121b is linear corresponding to the linearity of the slot portion 82b while the paths 121a and 121c are continuous and uninterrupted corresponding to the characteristics of the slot portions 82a and 82c.

Figure 5:
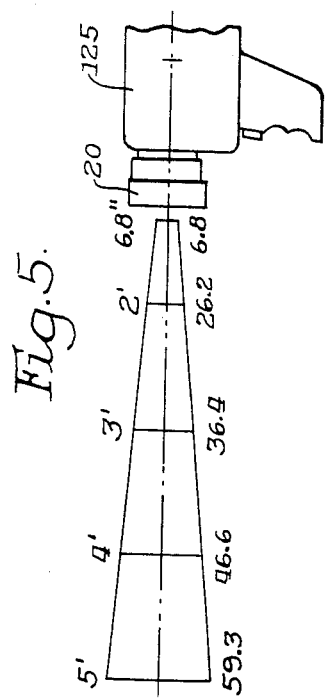
FIG. 5 is a diagrammatic representation of the performance characteristics of the optical system in the macro range beyond the telephoto end of the normal zoom range.
Figure 6:
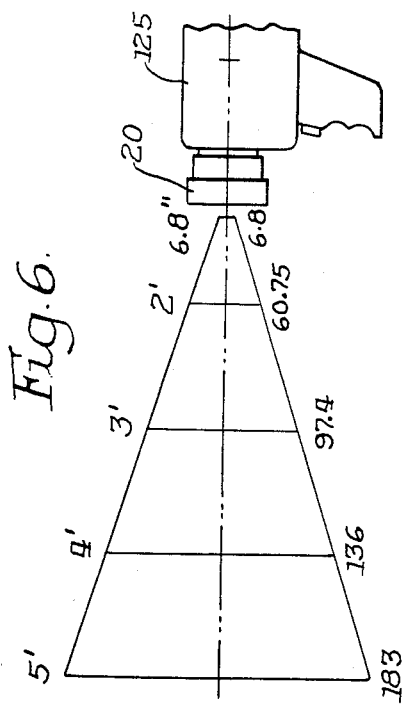
FIG. 6 is a diagrammatic representation of the performance characteristics of the optical system in the macro range beyond the wide angle end of the normal zoom range.

FIG. 5 diagrammatically illustrates the performance characteristics of the optical system 20 when it is in its macro telephoto mode. The optical system 20 is shown to be mounted on a movie camera 125. As previously explained, the macro modes are utilized when the object is five feet or closer, whereas the normal zoom range mode is used when the object is beyond five feet. Above the performance characteristics appear distances from the optical system 20 to the object, and the amount of reduction is shown below. When the optical system 20 is in the condition shown in FIG. 4A, the object is as close to the optical system 20 as possible, in this example 6.8 inches away. At such setting, the size of the image will be reduced by a ratio of 6.8 to 1. At the other end of the macro telephoto range, the object is five feet away and the reduction is 59.3. FIG. 6 depicts the performance characteristics for the optical system 20 set in the macro wide angle range. When in the condition depicted in FIG. 4E, the optical system 20 is focused on an object as close as possible to the lens, in this example 6.8 inches away, and the reduction is 6.8. On the other hand, when the optical system 20 is placed at the other extreme, that is, the first macro wide angle condition, the distance to the object is as great as it can be in the macro wide angle range, that is, in the example, five feet away. In such condition, the reduction ratio, in the example shown, is 183.

An examination of FIGS. 5 and 6 will show the desirability of having the two macro ranges. The user is able to select one of two different reduction ratios for an object at a given distance. For example, if the object is three feet away, he can have a reduction of 36.4 (FIG. 5) or 97.4 (FIG. 6) depending upon the extent of the scene he wishes to record. Presently available zoom lenses having macro capability, have macro capability only at one end so that there is no versatility as to the size of the recorded image.

The reduction ratio at the extreme macro conditions both in wide angle and telephoto is the same, that is, 6.8 at a 6.8 inch distance. This fact corresponds to the fact that the positions of the variator 60 and the compensator 70 in these conditions are the same. See FIGS. 4A and B.

Figure 7:
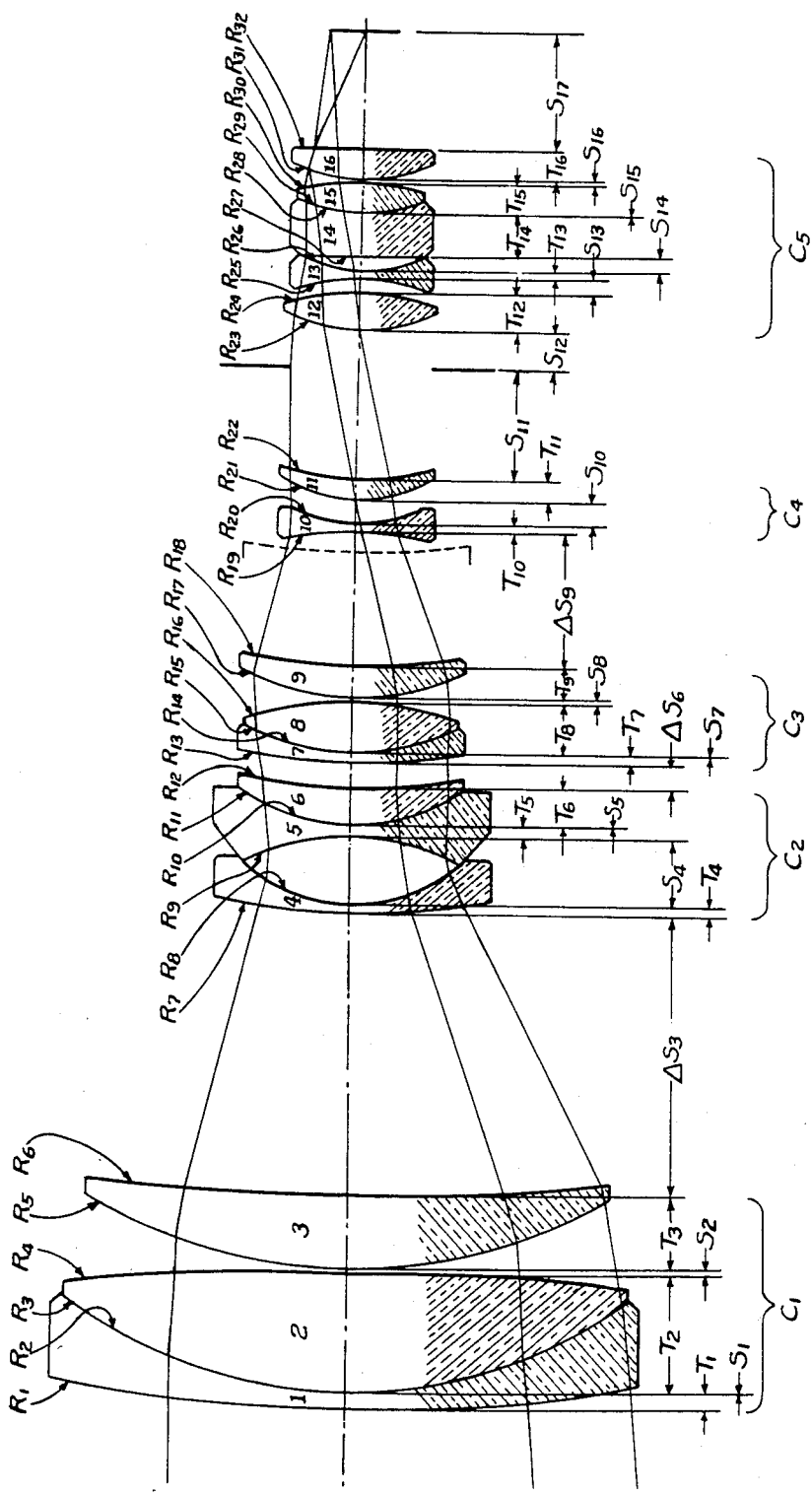
FIG. 7 is a diagrammatic sectional view of a preferred optical system according to the present invention.

Turning now to FIG. 7, a specific example of the optical system 20 will be described. $C_1$ represents the focusing assembly 40, $C_2$ represents the variator 60, $C_3$ represents the compensator 70, $C_4$ represents the collimator 100 and $C_5$ represents the image forming unit 110.

The front component $C_1$, comprises a front biconvex cemented doublet $L_1$, $L_2$, and a rear singlet $L_3$, predominately convex forwardly and spaced close to the doublet $L_1$, $L_2$. Air spaced from the rear of the singlet $L_3$ and adjustable relative thereto is component $C_2$ which comprises a front negative meniscus singlet $L_4$ convex forwardly and a rear biconcave, cemented doublet $L_5$, $L_6$ predominately concave forwardly. The doublet has collective internal contact surfaces $R_{10}$, $R_{11}$.

Component $C_3$ is variable air spaced relative to component $C_2$ and the following component $C_4$. Component $C_3$ comprises a positive doublet $L_7$, $L_8$ predominately convex rearwardly. During a zooming or focal length varying operation, the component $C_3$ is moved axially at a rate proportional to the rate of movement of component $C_2$. However, for macro focusing action in the macro telephoto range, the component $C_3$ remains substantially stationary while component $C_2$ is adjusted axially for focusing For macro focusing action in the macro wide angle range, both components $C_2$ and $C_3$ move in the manner shown in FIG. 4.

Component $C_4$ is fixed ahead of the stop of the optical system and comprises a front negative meniscus singlet $L_{10}$ and a rear positive meniscus singlet $L_{11}$ which together with the components $C_1$–$C_3$ form a substantially afocal system cooperating with the rear prime lens system $C_5$.

Component $C_5$ comprises a front biconvex singlet $L_{12}$, spaced somewhat from a negative element $L_{13}$. A doublet of elements $L_{14}$ and $L_{15}$ is arranged between element $L_{13}$ and rear element $L_{16}$ which is a singlet predominately convex forwardly.

The elements $L_1$ and $L_{16}$ have spherical surfaces or radii of curvature $R_1$ to $R_{32}$, axial thicknesses $T_1$ to $T_{16}$ and axial separations $S_1$ to $S_{17}$. The separations at $S_{11}$ and $S_{12}$ are sufficient to provide clearance for an aperture adjusting stop.

A preferred embodiment of the macro focusing, large aperture, zoom lens of the invention is constructed according to the table following wherein dimensions are as set forth and the refractive indices for the sodium D line and the Abbe dispersion numbers are respectively designated at $N_D$ and V.

| SYSTEM EFL | | HALF ANGLE OF FIELD | | |
|---|---|---|---|---|
| at W/A = 7.04mm (.2776 in.) | | 27.81° | | |
| at T/P = 43.05mm (1.6949 in.) | | 4.52° | | |
| at MID = 22.13mm (.8319 in.) | | 8.84° | | |
| LENS | RADII (mm) | THICKNESS (mm) | SPACINGS (mm) | $N_D$ | V |
| 1 | $R_1$ = 240.7589 | | | 1.755 | 27.6 |
| | | $T_1$ = 1.6510 | | | |
| | $R_2$ = −51.1988 | | | | |
| | | | $S_1$ = 0 | | |
| 2 | $R_3$ = 51.1988 | | | | |
| | | $T_2$ = 12.7000 | | 1.620 | 60.4 |
| | $R_4$ = 153.6954 | | | | |
| | | | $S_2$ = .1016 | | |
| 3 | $R_5$ = 43.6880 | | | | |
| | | $T_3$ = 7.7978 | | 1.651 | 55.9 |

-continued

|   |                    |               |                     |       |      |
|---|--------------------|---------------|---------------------|-------|------|
|   | R₆ = −139.7000     |               | S₃ = see below      |       |      |
| 4 | R₇ = 71.7550       | T₄ = .8128    |                     | 1.639 | 55.4 |
|   | R₈ = −16.5100      |               | S₄ = 6.6294         |       |      |
| 5 | R₉ = −24.0030      | T₅ = .8382    |                     | 1.620 | 60.4 |
|   | R₁₀ = −19.1008     |               | S₅ = 0              |       |      |
| 6 | R₁₁ = 19.1008      | T₆ = 3.5052   |                     | 1.785 | 25.8 |
|   | R₁₂ = −59.9948     |               | S₆ = see below      |       |      |
| 7 | R₁₃ = 58.9280      | T₇ = .8890    |                     | 1.805 | 25.4 |
|   | R₁₄ = −21.7424     |               | S₇ = 0              |       |      |
| 8 | R₁₅ = 21.7424      | T₈ = 5.6388   |                     | 1.641 | 60.1 |
|   | R₁₆ = 30.2260      |               | S₈ = .1016          |       |      |
| 9 | R₁₇ = 22.7203      | T₉ = 3.1496   |                     | 1.691 | 54.9 |
|   | R₁₈ = −93.1672     |               | S₉ = see below      |       |      |
| 10| R₁₉ = −45.5168     | T₁₀ = .7112   |                     | 1.691 | 54.9 |
|   | R₂₀ = −12.8016     |               | S₁₀ = 2.2352        |       |      |
| 11| R₂₁ = 14.6431      | T₁₁ = 2.0574  |                     | 1.805 | 25.4 |
|   | R₂₂ = −27.0256     |               | S₁₁ = 11.0490       |       |      |
|   |                    |               | ----STOP----        |       |      |
|   |                    |               | S₁₂ = 3.5560        |       |      |
| 12| R₂₃ = 18.0848      | T₁₂ = 3.6576  |                     | 1.744 | 44.8 |
|   | R₂₄ = 32.8168      |               | S₁₃ = 1.6002        |       |      |
| 13| R₂₅ = −21.9202     | T₁₃ = .7112   |                     | 1.805 | 25.4 |
|   | R₂₆ = −16.8656     |               | S₁₄ = .7366         |       |      |
| 14| R₂₇ = 61.2140      | T₁₄ = 4.3180  |                     | 1.805 | 25.4 |
|   | R₂₈ = −14.5288     |               | S₁₅ = 0             |       |      |
| 15| R₂₉ = 14.5288      | T₁₅ = 3.2512  |                     | 1.744 | 44.8 |
|   | R₃₀ = 26.9494      |               | S₁₆ = .1270         |       |      |
| 16| R₃₁ = 14.7320      | T₁₆ = 2.5654  |                     | 1.734 | 51.7 |
|   | R₃₂ = −463.9259    |               | S₁₇ = 11.4529       |       |      |

$S_3$ = 1.143 at one end of normal range
26.411 at other end of normal range
19.252 at middle of normal range
4.699 at one end of macro wide angle range
8.509 at other end of macro wide angle range
5.08 at middle of macro wide angle range
19.812 at one end of macro telephoto range
8.509 at other end of macro telephoto range
18.288 at middle of macro telephoto range $S_6$ = 38.405 at one end of normal range
2.804 at other end of normal range
14.256 at middle of normal range
33.8328 at one end of macro wide angle range
23.2918 at other end of macro wide angle range
33.0708 at middle of macro wide angle range
10.541 at one end of macro telephoto range
23.2918 at other end of macro telephoto range
12.2936 at middle of macro telephoto range $S_9$ = 1.600 at one end of normal range
11.933 at other end of normal range
7.640 at middle of normal range
2.6162 at one end of macro wide angle range
9.3472 at other end of macro wide angle range
2.9972 at middle of macro wide angle range
10.795 at one end of macro telephoto range
9.3472 at other end of macro telephoto range -continued 10.5664 at middle of macro telephoto range In the above table, the first column lists the lens elements numerically starting at the ray entrance side of the system. The second column lists the respective radii of the elements in millimeters. The third column lists the axial thickness T of the respective elements in millimeters. The fourth column lists in millimeters the axial spacings between the respective elements, the spacings between the stop and the adjacent elements, and the spacing between the last element and the nominal image plane. "EFL" is the effective focal length of the lens system at wide angle condition "W/A", at telephoto condition "T/P", and at mid range condition "MID". "One-half Angle of Field" is one half the angle between the continuation of the lens axis and a line from the nodal point of the lens to the most oblique point recorded on the film when considered at the above expressed conditions. In the above table the positive and negative signs giving the respective radii follow the "lensmaker's convention", to facilitate fabrication of the individual lens elements, wherein convex surfaces are positive and concave surfaces are negative.

What has been described therefore is an improved variable focal length optical system which is focusable within a normal range and also within two macro ranges respectively on either end of the normal range, yet one that is relatively inexpensive to manufacture.

I claim:

1. A variable focal length optical system which is focusable within a normal range defined at one end by a normal telephoto condition and at the other end by a normal wide angle condition, and being continuously focusable refractively by repositioning of internal lens elements within a first macro range defined at one end by a macro wide angle condition and at the other end by the normal wide angle condition, and being continuously focusable refractively by repositioning of internal lens elements within a second macro range defined at one end by a macro telephoto condition and at the other end by the normal telephoto condition, said optical system comprising focusing lens means for focusing said optical system on an object located within the normal range, a zoom lens assembly including variator lens means, compensator lens means and a camming sleeve having a variator camming slot and a compensator camming slot, said variator lens means and said compensator lens means being located in said camming sleeve and being mutually displaceable therein in a predetermined relationship for varying the focal length of said optical system, and collimator lens means for collimating rays from said compensator lens means and occupying a fixed position in said optical system irrespective of the focal length thereof, said variator lens means and said compensator means occupying predetermined positions corresponding to the various conditions of said optical system and which maintain the object distances finite throughout the range of said positions, said variator lens means including a variator holder, a variator lens group mounted therein, and a variator pin protruding therefrom and into said variator slot, said variator slot having first and second end portions and a middle portion therebetween respectively corresponding to the first macro range, the axis of said second end portion of said variator slot lying substantially in a plane, the second macro range, and the normal range, said compensator lens means including a compensator holder, a compensator lens group mounted therein, and a compensator pin protruding therefrom and into said compensator slot, said compensator slot having first and second end portions and a middle portion therebetween respectively corresponding to the first macro range and the second macro range and the normal range, the axis of said second end of portion of said compensator slot lying substantially in a plane, to permit continuous macro focusing at either end of the zoom range without extending the optical system beyond its normal focusing range length.

2. The optical system set forth in claim 1, wherein the axis of said first end portion of said variator slot lies substantially in a plane.

3. The optical system set forth in claim 2, wherein the axis of said middle portion of said variator slot lies substantially in a plane.

4. The optical system set forth in claim 1, wherein the arcuate extent of each of said second end portions of said variator slot and said second end portion of said compensator slot is about 58°.

5. The optical system of claim 1, wherein said middle portion of said compensator slot smoothly and continuously merges into said first end portion.

6. The optical system set forth in claim 1, wherein the positions of said variator lens means and said compensator lens means are substantially identical at both the first macro telephoto condition and the first macro wide angle condition.

7. The optical system set forth in claim 1, wherein said variator lens means is located nearer to said focusing lens means in the first macro telephoto condition than in the normal telephoto condition.

8. The optical system set forth in claim 1, having substantially the following specification:

| | SYSTEM EFL | | HALF ANGLE OF FIELD | | |
|---|---|---|---|---|---|
| | at W/A = 7.04 mm (.2776 in.) | | 27.81° | | |
| | at T/P = 43.05 mm (1.6949 in.) | | 4.52° | | |
| | at MID = 22.13 mm (.8319 in.) | | 8.84° | | |
| LENS | RADII (mm.) | THICKNESS (mm.) | SPACINGS (mm) | $N_D$ | V |
| 1 | $R_1$ = 240.7589 | | | 1.755 | 27.6 |
| | | $T_1$ = 1.6510 | | | |
| | $R_2$ = −51.1988 | | | | |
| | | | S1 = 0 | | |
| 2 | $R_3$ = 51.1988 | | | | |
| | | $T_2$ = 12.7000 | | 1.620 | 60.4 |
| | $R_4$ = 153.6954 | | | | |
| | | | $S_2$ = .1016 | | |

-continued

| | | | | | |
|---|---|---|---|---|---|
| 3 | $R_5 = 43.6880$ | $T_3 = 7.7978$ | | 1.651 | 55.9 |
| | $R_6 = -139.7000$ | | $S_3 =$ see below | | |
| 4 | $R_7 = 71.7550$ | $T_4 = .8128$ | | 1.639 | 55.4 |
| | $R_8 = -16.5100$ | | $S_4 = 6.6294$ | | |
| 5 | $R_9 = -24.0030$ | $T_5 = .8382$ | | 1.620 | 60.4 |
| | $R_{10} = -19.1008$ | | $S_5 = 0$ | | |
| 6 | $R_{11} = 19.1008$ | $T_6 = 3.5052$ | | 1.785 | 25.8 |
| | $R_{12} = -59.9948$ | | $S_6 =$ see below | | |
| 7 | $R_{13} = 58.9280$ | $T_7 = .8890$ | | 1.805 | 25.4 |
| | $R_{14} = -21.7424$ | | $S_7 = 0$ | | |
| 8 | $R_{15} = 21.7424$ | $T_8 = 5.6388$ | | 1.641 | 60.1 |
| | $R_{16} = 30.2260$ | | $S_8 = .1016$ | | |
| 9 | $R_{17} = 22.7203$ | $T_9 = 3.1496$ | | 1.691 | 54.9 |
| | $R_{18} = -93.1672$ | | $S_9 =$ see below | | |
| 10 | $R_{19} = -45.5168$ | $T_{10} = .7112$ | | 1.691 | 54.9 |
| | $R_{20} = -12.8016$ | | $S_{10} = 2.2352$ | | |
| 11 | $R_{21} = 14.6431$ | $T_{11} = 2.0574$ | | 1.805 | 25.4 |
| | $R_{22} = -27.0256$ | | $S_{11} = 11.0490$ ----STOP---- | | |
| 12 | $R_{23} = 18.0848$ | $T_{12} = 3.6576$ | $S_{12} = 3.5560$ | 1.744 | 44.8 |
| | $R_{24} = 32.8168$ | | $S_{13} = 1.6002$ | | |
| 13 | $R_{25} = -21.9202$ | $T_{13} = .7112$ | | 1.805 | 25.4 |
| | $R_{26} = -16.8656$ | | $S_{14} = .7366$ | | |
| 14 | $R_{27} = 61.2140$ | $T_{14} = 4.3180$ | | 1.805 | 25.4 |
| | $R_{28} = -14.5288$ | | $S_{15} = 0$ | | |
| 15 | $R_{29} = 14.5288$ | $T_{15} = 3.2512$ | | 1.744 | 44.8 |
| | $R_{30} = 26.9494$ | | $S_{16} = .1270$ | | |
| 16 | $R_{31} = 14.7320$ | $T_{16} = 2.5654$ | | 1.734 | 51.7 |
| | $R_{32} = -463.9259$ | | $S_{17} = 11.4529$ | | |

Variable Spacings $S_3 =$ 1.143 at W/A end of normal range
26.411 at T/P end of normal range
19.252 at middle of normal range
4.699 at one end of macro wide angle range
8.509 at other end of macro wide angle range
5.080 at middle of macro wide angle range
19.812 at one end of macro telephoto range
8.509 at other end of macro telephoto range
18.288 at middle of macro telephoto range
$S_6 =$ 38.405 at W/A end of normal range
2.804 at T/P end of normal range
14.256 at middle of normal range
33.8328 at one end of macro wide angle range
23.2918 at other end of macro wide angle range
33.0708 at middle of macro wide angle range
10.541 at one end of macro telephoto range
23.2918 at other end of macro telephoto range
12.2936 at middle of macro telephoto range
$S_9 =$ 1.600 at W/A end of normal range
11.933 at T/P end of normal range
7.640 at middle of normal range
2.6162 at one end of macro wide angle range -continued 9.3472 at other end of macro wide angle range
2.9972 at middle of macro wide angle range
10.795 at one end of macro telephoto range
9.3472 at other end of macro telephoto range
10.5664 at middle of macro telephoto range wherein the first column lists the lens elements numerically starting at the ray entrance side of the system; the second column lists the respective base radii $R_1$ to $R_{32}$, using the convention that the negative (−) values of the radii indicating surfaces which are concave and the positive (+) values of the radii indicating surfaces which are covex; the third column lists the thicknesses $T_1$–$T_{16}$ of the respective elements; the fourth column lists the axial spacings $S_1$ to $S_{17}$ between the respective elements, the spacings between the stop and the adjacent elements, and the spacing between the last element and the image plane; and the fifth and sixth columns respectively list the index of refraction for the Sodium D line $N_D$ and the dispersive index V of the optical materials of the respective elements, wherein said focusing lens means consists of the lenses 1 through 3; and said variator lens means consists of the lenses 4 through 6, said compensator lens means consists of the lenses 7 through 9 and said collimator lens means consists of the lenses 10 and 11.

* * * * *

UNITED STATES PATENT AND TRADEMARK OFFICE
CERTIFICATE OF CORRECTION

PATENT NO. : 4,298,251
DATED : November 3, 1981
INVENTOR(S) : Rudolf Hartmann

It is certified that error appears in the above-identified patent and that said Letters Patent are hereby corrected as shown below:

Column 8, line 19, change "variable" to --variably--; and

Column 8, line 42, change "and" to --to--.

Signed and Sealed this

Twenty-seventh Day of April 1982

[SEAL]

Attest:

GERALD J. MOSSINGHOFF

Attesting Officer    Commissioner of Patents and Trademarks